United States Patent
Waldner

(10) Patent No.: US 7,488,149 B2
(45) Date of Patent: Feb. 10, 2009

(54) MOVABLE CONVEYOR FOR LOADING A CONTAINER

(75) Inventor: Samuel Waldner, Decker (CA)

(73) Assignee: Decker Colony Farms Ltd., Decker, Manitoba (CA)

( * ) Notice: Subject to any disclaimer, the term of this patent is extended or adjusted under 35 U.S.C. 154(b) by 522 days.

(21) Appl. No.: 11/066,549

(22) Filed: Feb. 28, 2005

(65) Prior Publication Data

US 2006/0193717 A1 Aug. 31, 2006

(51) Int. Cl.
*B60P 1/52* (2006.01)
(52) U.S. Cl. .................. 414/532; 414/505; 414/523; 414/531; 414/534; 414/535; 280/124.116; 198/311; 198/315; 198/589
(58) Field of Classification Search ............. 414/505, 414/523, 531–535; 280/124.116; 198/311, 198/589, 315
See application file for complete search history.

(56) References Cited

U.S. PATENT DOCUMENTS

| | | | |
|---|---|---|---|
| 2,732,959 A * | 1/1956 | Penning ............. 414/335 |
| 3,498,483 A * | 3/1970 | Meharry ............. 414/523 |
| 4,813,839 A * | 3/1989 | Compton ............. 414/345 |
| 4,963,066 A * | 10/1990 | Boppart ............. 414/376 |
| 5,718,556 A | 2/1998 | Forsyth | |
| 7,063,497 B2 * | 6/2006 | Mast et al. ............. 414/572 |
| 7,191,889 B1 * | 3/2007 | Heley ............. 198/315 |
| 2005/0238469 A1 * | 10/2005 | Cresswell et al. ........... 414/523 |

* cited by examiner

*Primary Examiner*—Michael S Lowe
(74) *Attorney, Agent, or Firm*—Adrian D. Battison; Ade & Company Inc.

(57) ABSTRACT

A container for example for a seeder includes a filling conveyor mounted on one with a bottom hopper and an upper filling spout with the conveyor being movable in a direction inwardly and outwardly relative to the side of the container to different positions relative to the container for cooperation with a supply. This is achieved by mounting the conveyor on a swivel coupling at the outer end of an arm which can be raised and lowered by pivotal movement about an inner end at the container. The hopper is supported on two pairs of ground wheels, each pair being arranged on a respective side of the hopper for supporting the respective side and each pair comprising a respective one of a pair of castor wheels mounted at respective ends of a pivotal beam extending along the respective side of the hopper and pivotal about an axis transverse to the hopper.

12 Claims, 9 Drawing Sheets

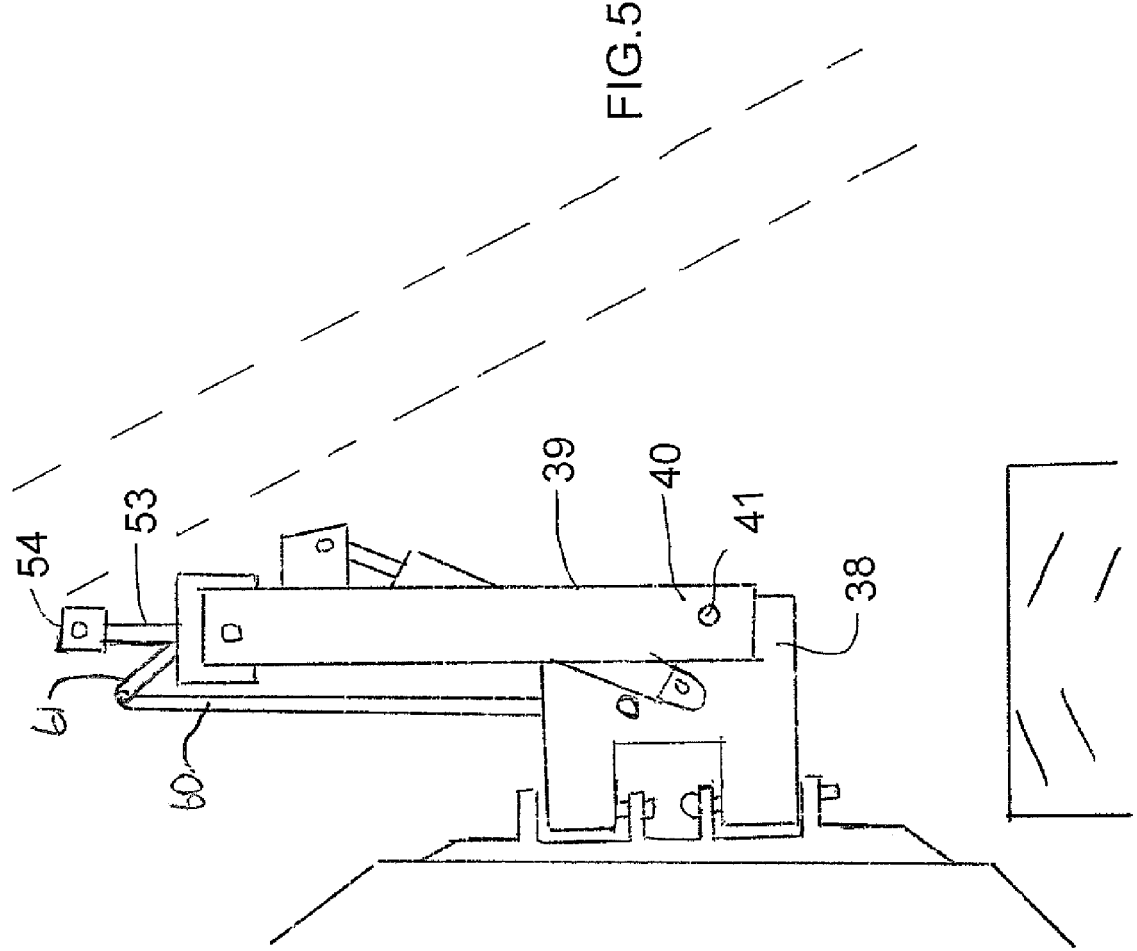

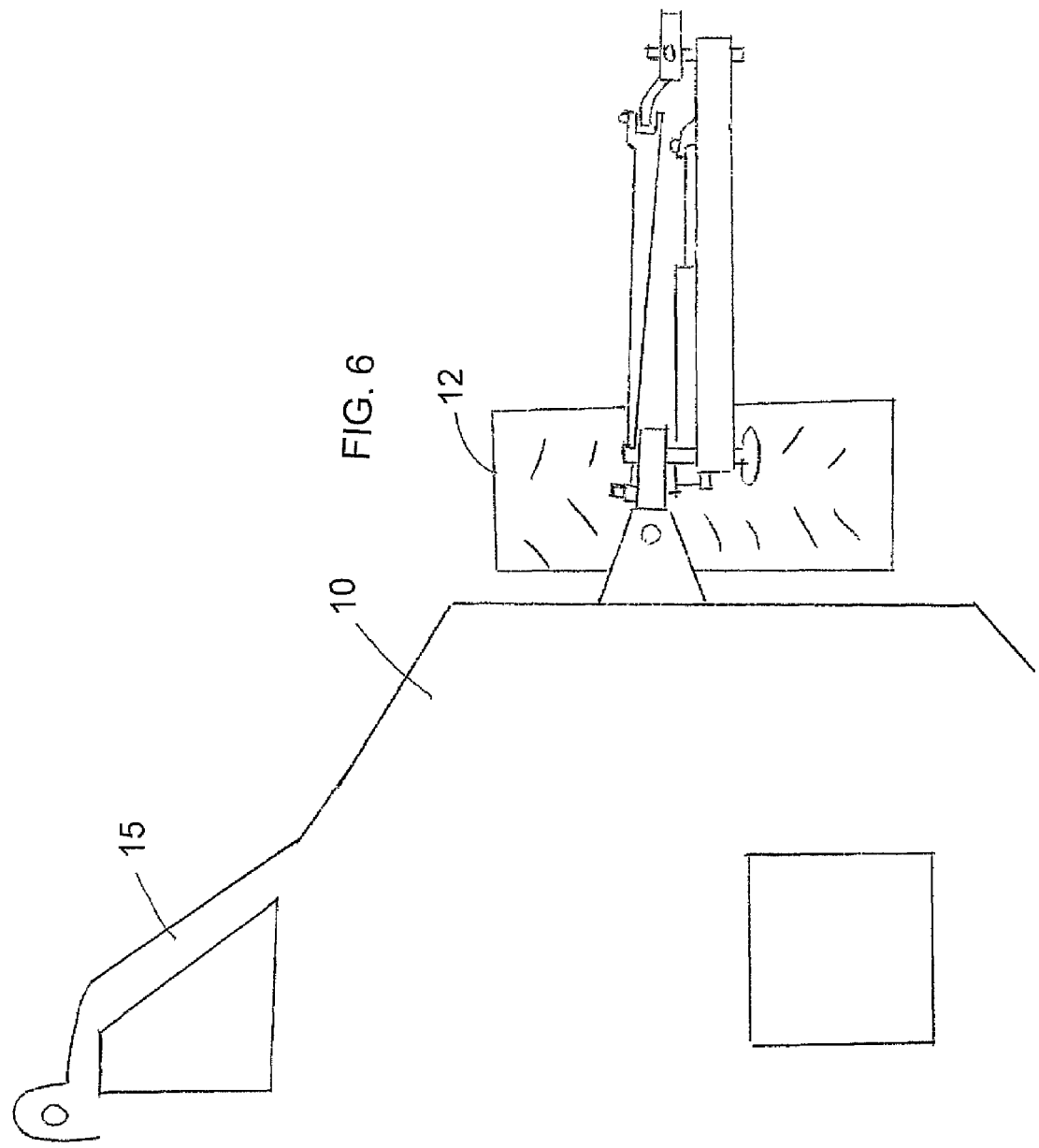

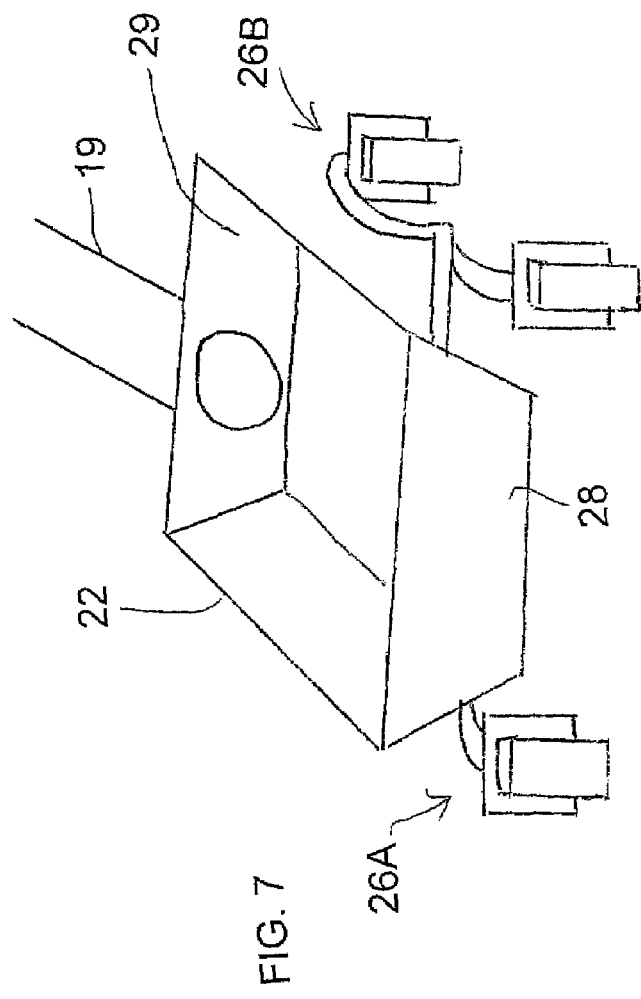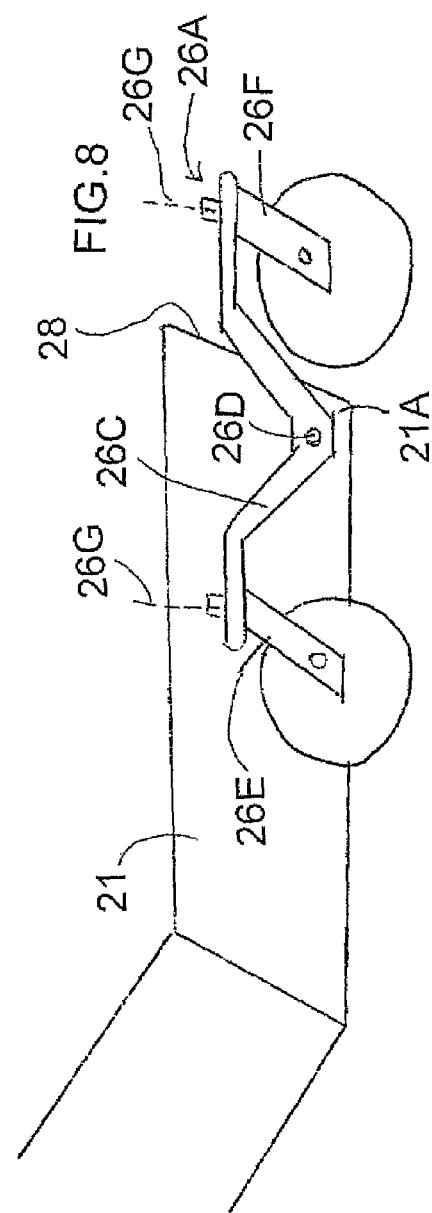

US 7,488,149 B2

MOVABLE CONVEYOR FOR LOADING A CONTAINER

This invention relates to an apparatus including a movable conveyor movable to allow the hopper of the conveyor to be moved to positions to cooperate with a supply vehicle.

BACKGROUND OF THE INVENTION

The loading of the tank of a seeder has become more difficult in recent years due to the increase in size of the container or tank, due to the difficulty of reaching the loading opening of the tank and due to the current use of belly-dump trailers rather than the conventional lift trailer.

Various arrangements have been used to resolve this problem and many seeder tanks now carry a loading mechanism in the form of a conveyor which is mounted on a suitable mounting assembly at the side of the tank. Generally the conveyor duct is mounted at the end of an arm which can swivel side to side without a vertical axis and the duct itself can also swivel about a pin at the end of the arm so that the location of the hopper at the lower end of the duct can be maneuvered to different positions. However these arrangements are generally limited to arcuate movement by virtue of vertical pivot axes so that the hopper is limited in its movement. While this is acceptable for a trailer of the type which dumps at the rear, so that the trailer can be backed up to the hopper, it is not acceptable or raises significant difficulties in the event that it is required to unload the trailer from the center or from a belly-mount discharge opening since the trailer and its tractor are difficult to maneuver, since the seeder itself can not be maneuvered in the field and since the loading conveyor has limited movement.

Other arrangements have been proposed to overcome this problem but they are very expensive including providing conveyors mounted on the trailer itself. These have generally not been satisfactory.

SUMMARY OF THE INVENTION

It is one object of the invention to provide an improved filling system for a container such as a seeder tank in which the conveyor is movable to allow the hopper of the conveyor to be moved to positions to cooperate with a supply vehicle.

According to one aspect of the invention there is provided an apparatus comprising:

a container;

a conveyor duct having a conveyor member mounted therein and operable to move a particulate material within the duct from a lower feed end to an upper discharge end;

a hopper at the lower feed end into which the particulate material can be poured;

a discharge spout at the upper end for discharging the particulate material from the duct;

at least one ground wheel on the hopper for supporting the hopper for movement over the ground adjacent the container to allow movement of the hopper to different positions relative to the container for cooperation with a supply;

and a mounting assembly for mounting the conveyor duct on the container for movement relative thereto, the mounting assembly comprising;

a support bracket mounted on a side of the container;

a first portion mounted on the support bracket for pivotal movement about an upright axis such that the first portion can turn about the axis from a position along the side of the container to a position extending outwardly from the container;

an arm portion having an inner end mounted on the first portion for pivotal movement about a transverse axis on the first portion such that an outer end of the arm can move from a raised position standing upwardly from the first portion along the side of the container to a lowered position extending outwardly from the side of the container;

a drive member for driving lifting movement of the arm portion;

a swivel connection between the outer end of the arm portion and the conveyor duct at a position on the conveyor duct intermediate the upper and lower ends, the swivel connection being arranged to support the conveyor duct at the outer end of the arm portion;

to allow the conveyor duct to pivot about a horizontal axis transverse to the duct such that the conveyor duct can change in angle relative to the arm portion as the arm portion raises and lowers and such that, with the hopper resting on the ground and the arm portion extending outwardly from the side of the container, raising of the arm portion causes the hopper to be pulled in toward the container while lifting the upper end of the conveyor duct upward;

and to allow the conveyor duct to pivot about an upright axis at the outer end of the arm portion.

Preferably the swivel connection includes an upright post which extends from the outer end of the arm to the conveyor duct and coupling member which controls an angle of the post relative to the arm portion to maintain the post upright as the arm portion changes in angle.

Preferably the post provides the upright axis at the outer end of the arm portion.

Preferably the conveyor duct is pivotally connected to the upper end of the post to define the horizontal axis.

Preferably the coupling member comprises a link extending from the first portion to the post and extending along the arm portion generally parallel thereto.

Preferably the drive member comprises a hydraulic cylinder.

Preferably the arm portion is telescopic to extend the outer end away from the container.

Preferably the arm portion and conveyor duct can be moved from a retracted position alongside the container with the hopper drawn in toward the container to allow a supply vehicle to move along side the container to an extended position in which the hopper is moved outwardly to underlie a center point of the vehicle to receive material discharged therefrom.

Preferably the at least one ground wheel of the hopper comprises two pairs of ground wheels, each pair being arranged on a respective side of the hopper for supporting the respective side and each pair comprising a respective one of a pair of castor wheels mounted at respective ends of a pivotal beam extending along the respective side of the hopper and pivotal about an axis transverse to the hopper.

According to a second aspect of the invention there is provided an apparatus comprising:

a container;

a conveyor duct having a conveyor member mounted therein and operable to move a particulate material within the duct from a lower feed end to an upper discharge end;

a hopper at the lower feed end into which the particulate material can be poured;

a discharge spout at the upper end for discharging the particulate material from the duct;

and a mounting assembly for mounting the conveyor duct on the container for movement relative thereto to allow movement of the hopper in a direction inwardly and outwardly relative to the side of the container to different positions relative to the container for cooperation with a supply;

wherein the hopper is supported on two pairs of ground wheels, each pair being arranged on a respective side of the hopper for supporting the respective side and each pair comprising a respective one of a pair of castor wheels mounted at respective ends of a pivotal beam extending along the respective side of the hopper and pivotal about an axis transverse to the hopper.

BRIEF DESCRIPTION OF THE DRAWINGS

One embodiment of the invention will now be described in conjunction with the accompanying drawings in which:

FIG. 5 is a rear elevational view similar to FIG. 2 on an enlarged scale.

FIG. 6 is a top plan view of the blades of FIG. 1.

FIG. 7 is an isometric view of the hopper of the duct.

FIG. 8 is a rear elevational view of the hopper on an enlarged scale in an extended position shown in FIG. 1.

In the drawings like characters of reference indicate corresponding parts in the different figures.

DETAILED DESCRIPTION

Figure 1:
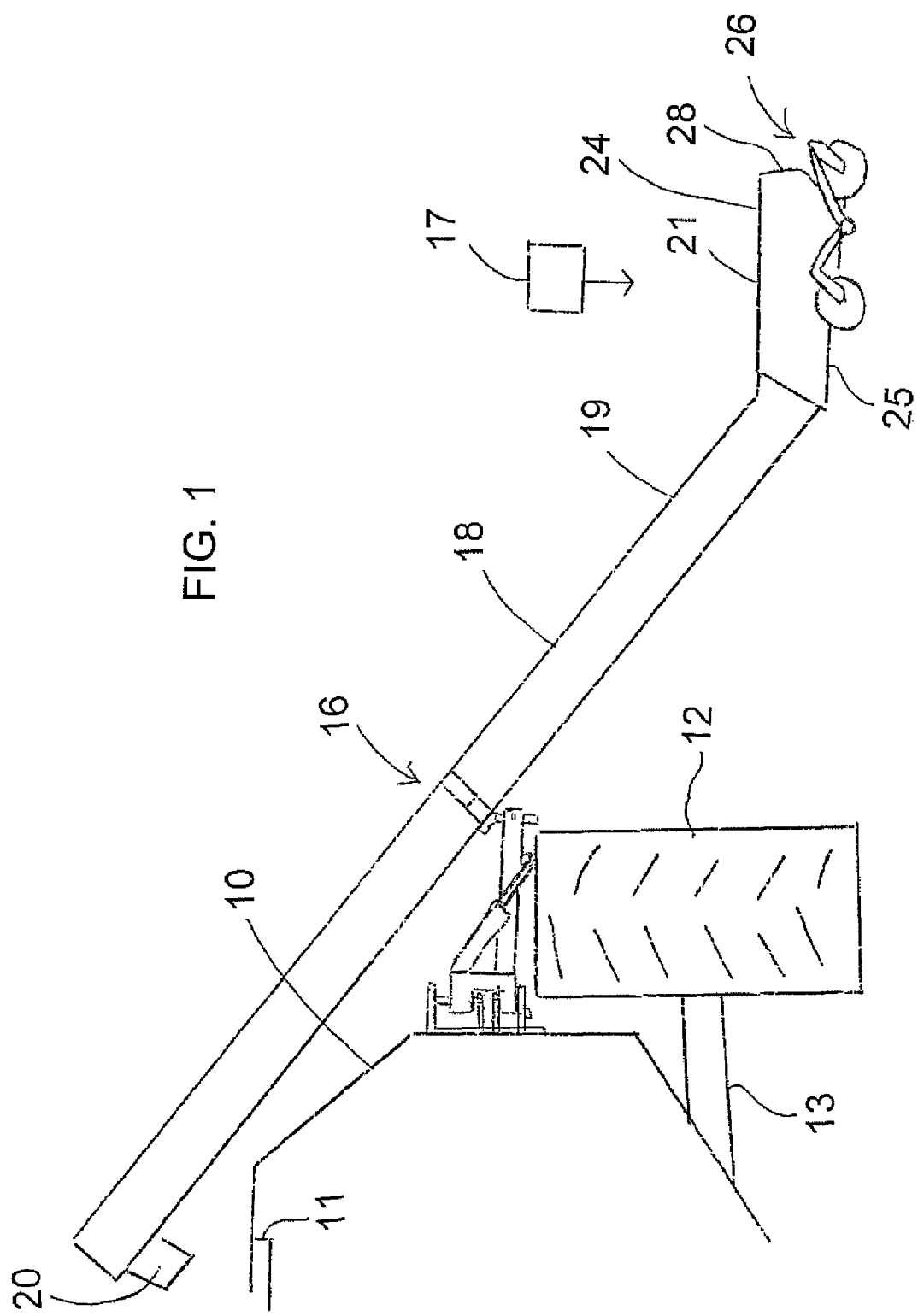
FIG. 1 is a rear elevational view of a conveyor apparatus for mounting on the side of a seeder tank for loading the tank from a supply vehicle.

A tank 10 of a seeder includes a top opening 11 through which the tank can be filled. The tank is mounted on ground wheels 12 at respective sides of the tank carried on an axle 13. The tank is towed by a hitch 15 (FIG. 6) at a suitable location relative to the seeder. The apparatus of the present invention provides a loading device generally indicated at 16 for loading seed materials from a supply location generally indicated at 17 through a conveyor 18 into the opening 11. The conveyor 18 includes a duct 19 which has a discharge spout 20 at the upper end and a hopper 21 at the lower end.

The conveyor duct is generally tubular and contains a conveyor member driven by suitable drive mechanisms (not shown). The conveyor member is commonly in the form of an auger flight but may be replaced by a belt or in some cases both a belt and a flight are used. Other transport elements may also be used since the operation of the conveyor itself is not part of the present invention and may different arrangements are available to one skilled in the art.

Figure 4:
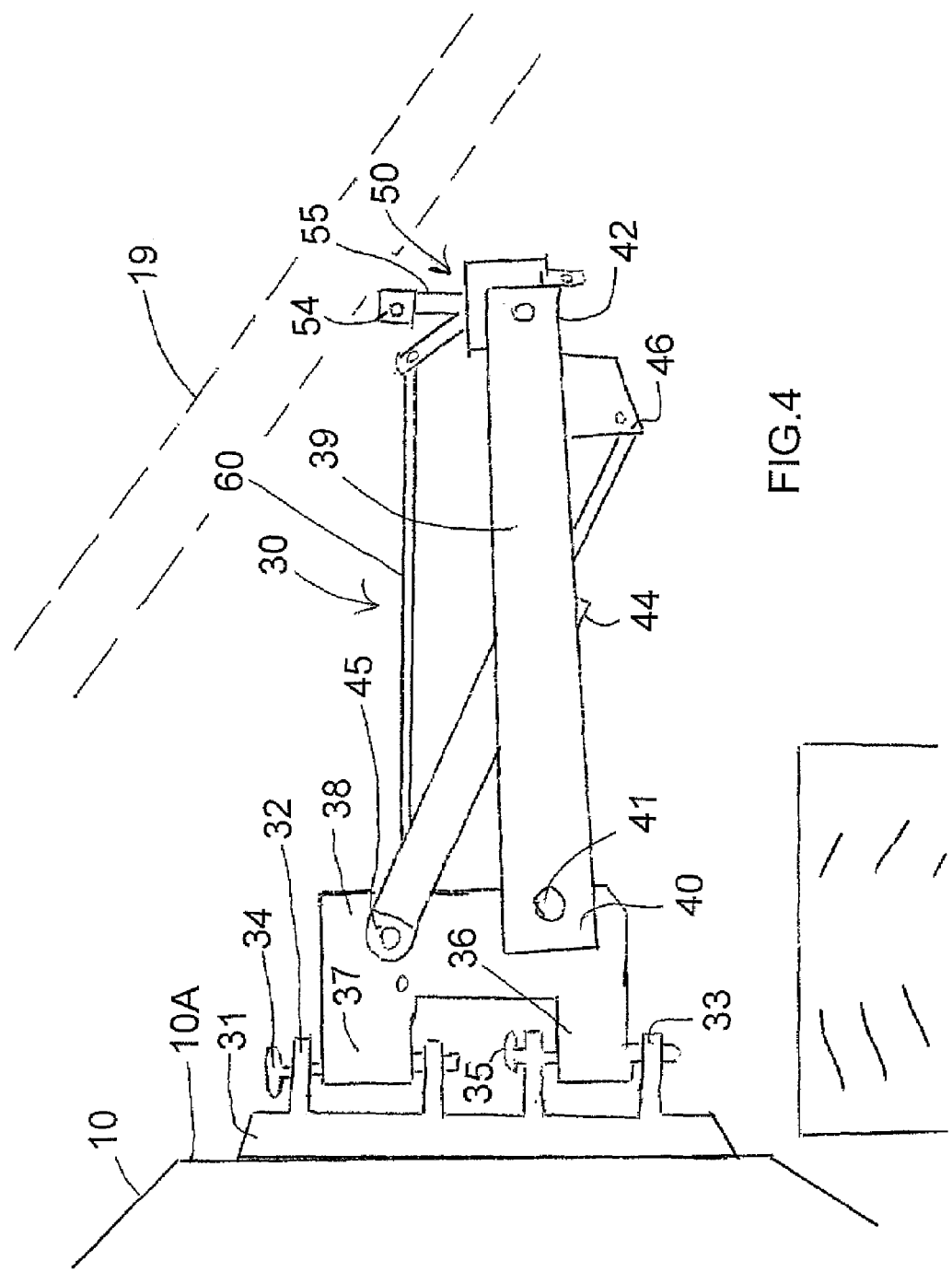
FIG. 4 is a rear elevational view similar to FIG. 1 on an enlarged scale.
Figure 9:
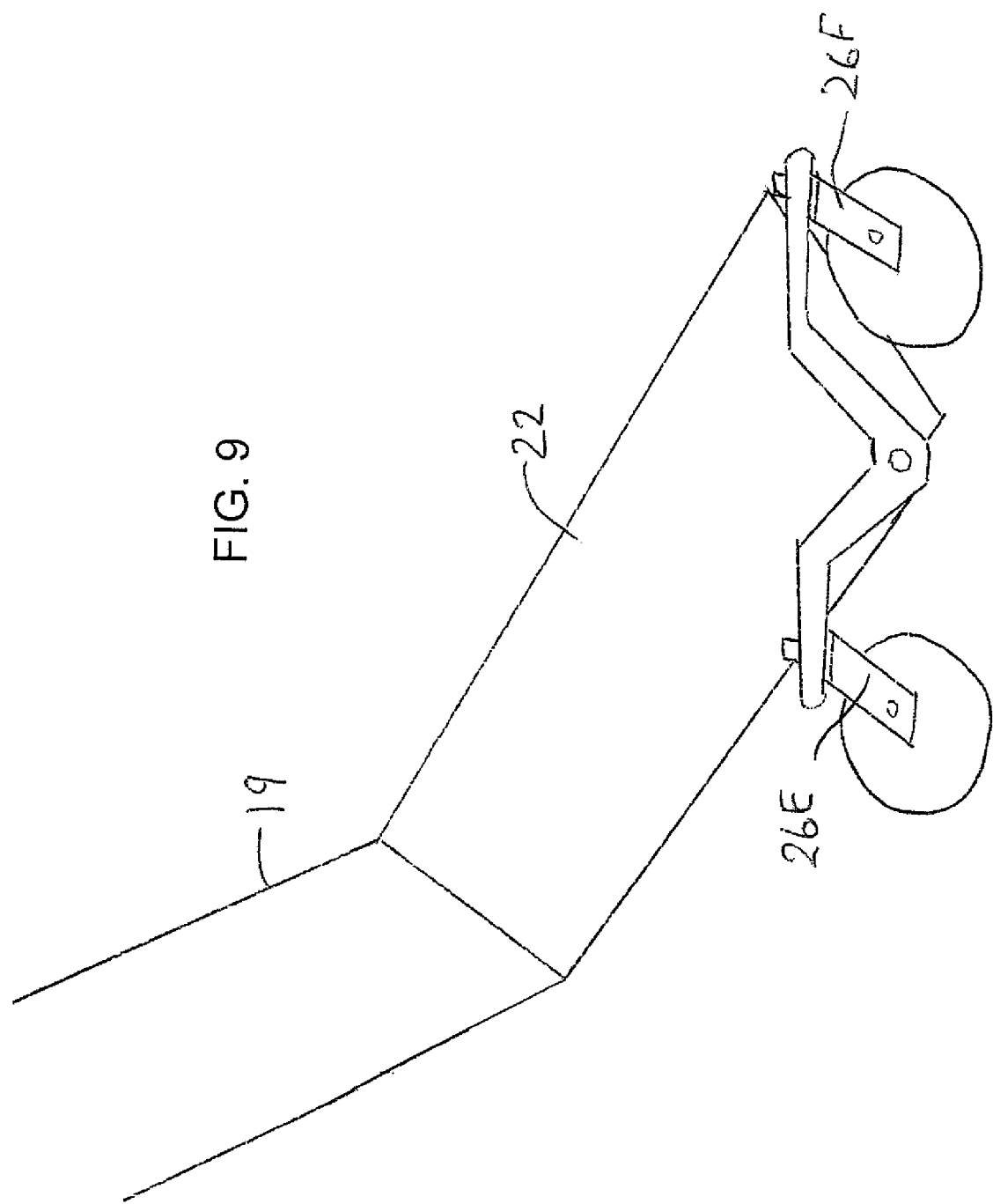
FIG. 9 is a rear elevational view of the hopper shown in the retracted position of FIG. 2.
Figure 10:
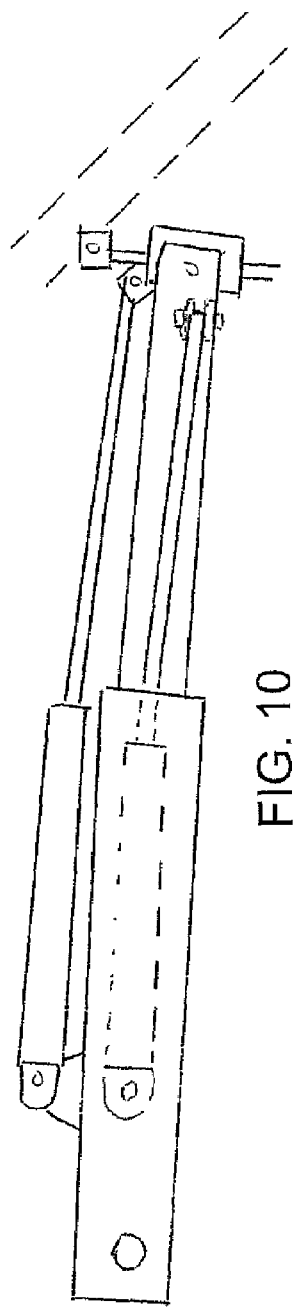
FIG. 10 is a rear elevational view of an alternative embodiment in an extended position.
Figure 11:
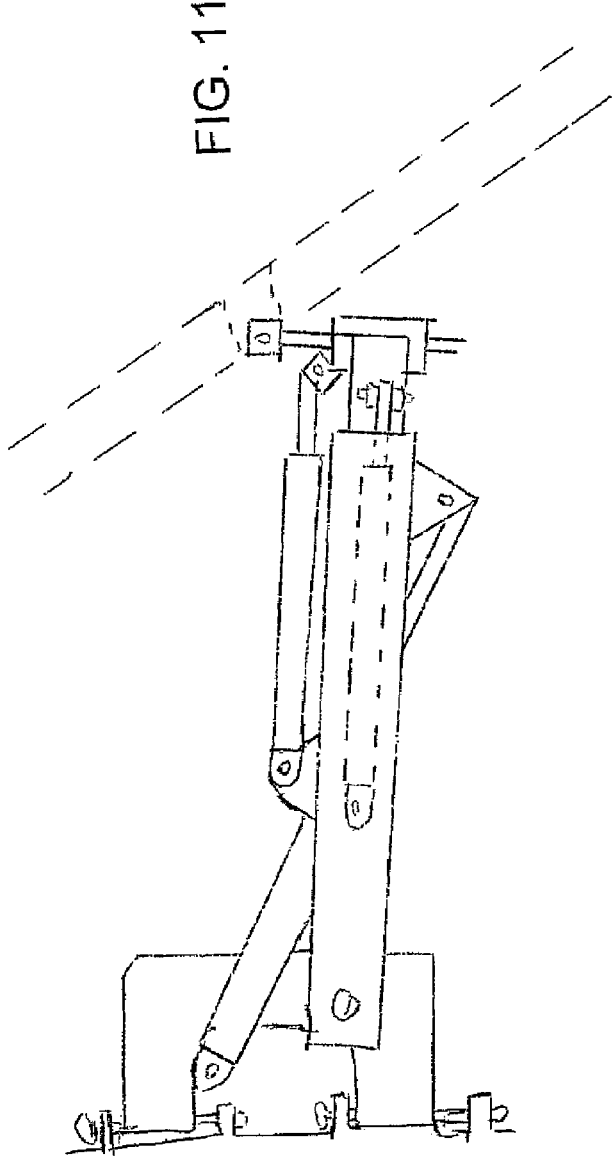
FIG. 11 is a rear elevational view of the embodiment of FIG. 10 in the retracted position.

The hopper 21 forms a generally rectangular container 22 as best shown in FIG. 7 with a front wall 28 and a rear wall 29 through which the tube 19 extends. The hopper is arranged to receive the material from the supply 17 and to collect that material for engagement with the transportation element within the tube 19 for carrying the material to the discharge spout 20. The hopper has an upper surface 24 and a bottom wall 25 and these are arranged at an angle to a longitudinal axis of the tube 19. The hopper is mounted on ground wheels generally indicated at 26 for allowing movement of the hopper in required directions across the ground. As best shown in FIG. 4, the tube 19 is carried on a mounting assembly 30 for movement relative to the tank 10 to required positions of the hopper on the ground. In particular the mounting assembly 30 allows the hopper 21 to move from the extended position shown in FIG. 1 in a direction at right angles to the side wall of the tank in a direction longitudinally of the duct from the extended position to the retracted position shown in FIG. 2.

The amount of movement between the extended and retracted positions is of the order of 6 or 7 feet so that the hopper 21 can move from a position straddling the centerline of a vehicle along side the tank to a position retracted beyond the inside wheels of the vehicle. As the width of a traditional transport vehicle of this type is of the order of 4 feet, a movement distance of the order of 6 feet is necessary to move from a position in which the hopper is clear of the wheels to a position in which the hopper is straddling the centerline and has a outer edge 28 at the outer edge of the discharge opening of the vehicle.

Figure 3:
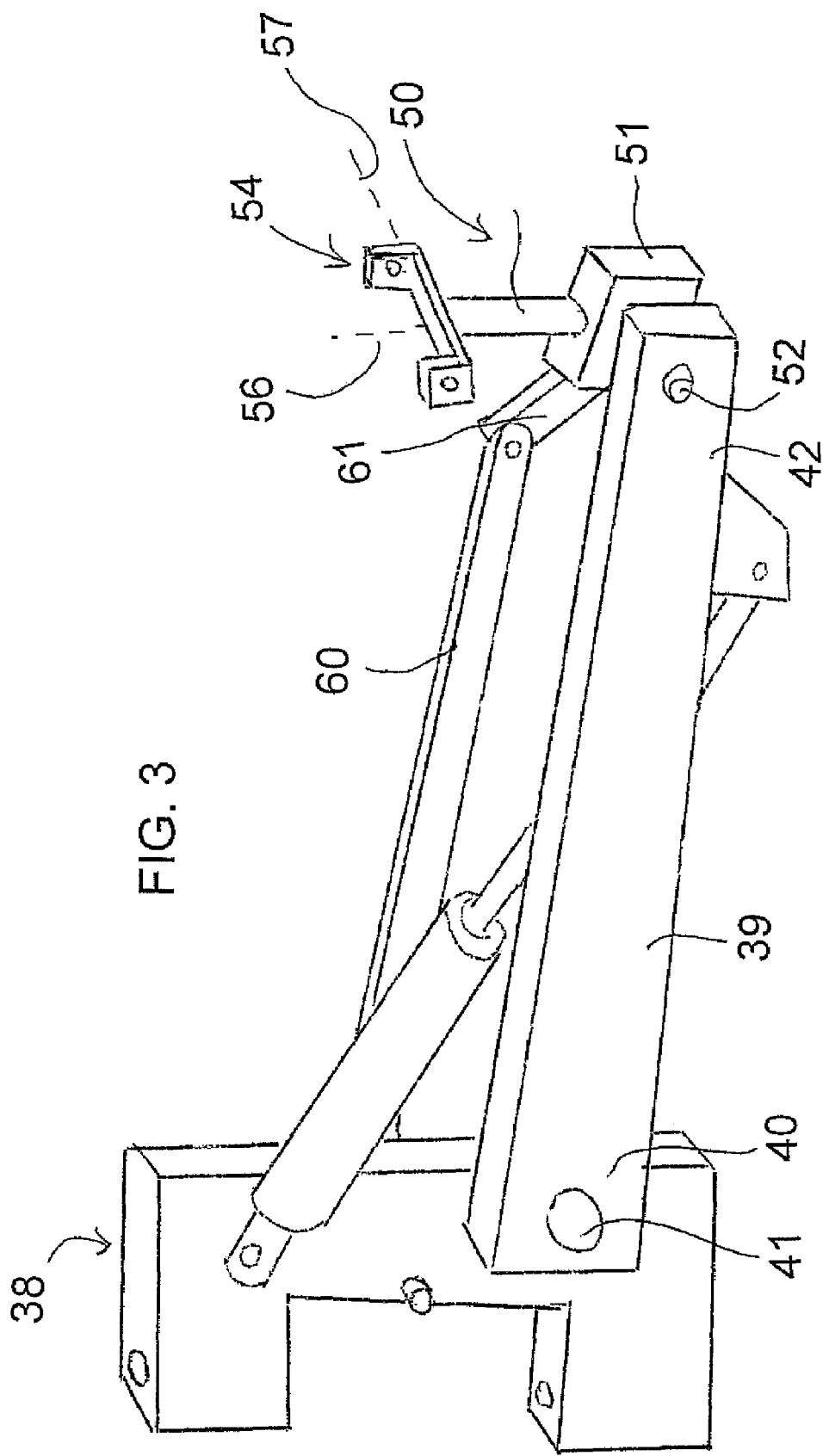
FIG. 3 is an isometric view of the mounting assembly itself with the conveyor duct removed.

The mounting assembly 30 comprises a bracket 31 is attached to the side 10A of the tank 10. The bracket 31 includes a pair of clevises 32 and 33 each defining a vertical pivot axis by way of a vertical pin 34, 35. These clevises receive end projections 36 and 37 of a first pivot member 38 which is therefore carried on the bracket 31. The first pivot member 38 thus pivots about a common vertical axis defined by the pins 34, 35 and provides a support for a pivot arm portion 39 which has an inner end 40 mounted on a horizontal pivot pin 41 so that the outer end 42 of the arm can move from a fully extended position which is generally horizontal as shown in FIGS. 3 and 4 to a vertical position shown in FIG. 5.

The movement of the arm 39 about the pivot pin 41 is obtained by a drive member 44 in a form of a hydraulic cylinder. The hydraulic cylinder is connected at one end by a lug 45 to the first portion 38 at a position above the arm 39 and extends therefrom to a clevis 46 on the underside of the arm. Thus extension of the cylinder acts to pivot the arm about the pin 41 from the extended position shown to the raised position shown in FIG. 5.

The duct or tube 19 is mounted on the outer end 42 of the arm by a swivel coupling generally indicated at 50. The swivel coupling 50 best shown in FIG. 3 includes a base block 51 mounted on a horizontal pivot pin 52 extending through the outer end 42 of the arm. Thus the block 51 is pivotal about a horizontal transverse axis. The block 51 carries a post 53 which stands upwardly from the block and carries at its upper end a clevis 54 for receiving a bracket 55 welded to the underside of the tube 19. The post 53 can rotate about an axis 56 longitudinal of the post and extending through the block 51. The clevis 54 defines a pivot axis 57 which extends across the bracket 55 of the tube so as to allow the tube to pivot relative to the post.

The post 53 is maintained substantially upright so that the axis 56 is substantially upright at all times during the movement of the arm 39. Thus in the position shown in FIG. 4 the post 53 is upright and in a position shown also in FIG. 5 the post 53 is upright. This supports the clevis 54 and the tube carried thereby at a position spaced from the outer end 42 of the arm so it is properly supported at a required position without abutment of the tube with the arm. The post 53 is held upright by a crank 60 which has an inner end attached to the first portion 38 and an outer end which engages with a lever 61 carried on the block 51. Thus as the arm pivots upwardly, the crank 60 pushed on the lever 61 thus tending to pivot the block 51 about the pin 52. The geometry is arranged so that the post 53 is maintained substantially vertical. This holds the tube upwardly above the outer end of the arm at all times and ensures sufficient lift on the tube in the position shown in FIG. 5 so that the tube is raised upwardly sufficiently to clear the top of the tank.

The tube and the bracket can thus be pivoted to a position along side the tank for storage and transportation. Suitable latching arrangements can be provided to hold the tube in place. This is achieved by rotating the first portions 38 about the vertical axis defined by the pins 34 and 35 so that the bracket moves to the along side position following which the tube can also be rotated on the post 53 to a required position.

Figure 2:
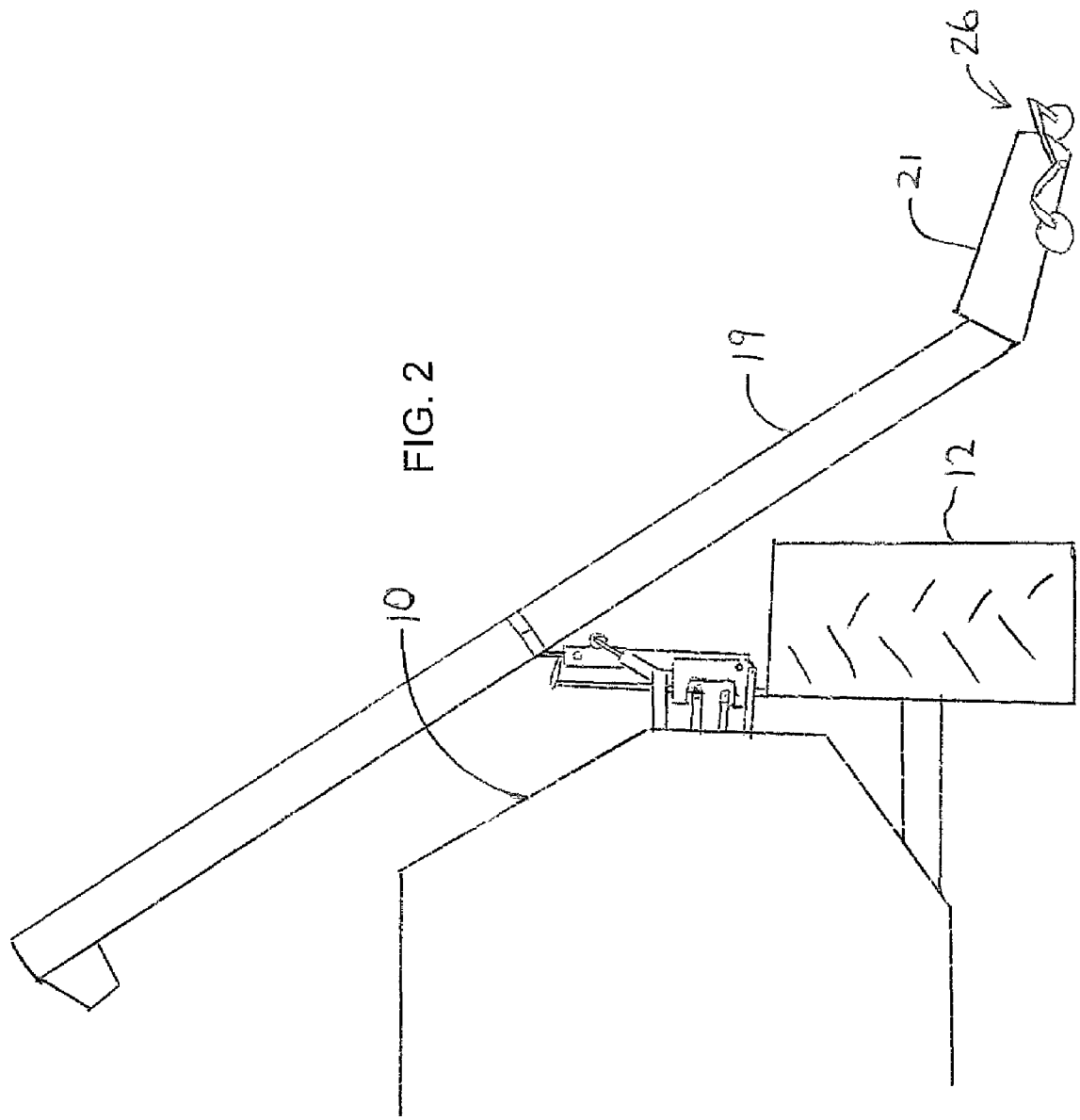
FIG. 2 is a rear elevational view of the same apparatus as in FIG. 1 however moved inwardly to a retracted position.

The extension movement between the retracted position of FIG. 2 and the extended position of FIG. 1 has a length of movement of the hopper of the order of 6 to 7 feet. This is achieved without having an arm 39 of the same length and the arm can be of reduced length of the order of 3 to 4 feet since there is a compound movement of the hopper in its movement from the retracted to the extended position. In particular it will be noted that the angle of the tube is also changed since the hopper remains resting on the ground and thus, as the hopper moves inwardly the tube must rotate around the axis 57 of the clevis 54 to a more elevated angle. In FIG. 1 the angle is shown at the order of 45°. In the position of FIG. 2, the angle is closer to 60° and this change in angle is sufficient to move the outside end of the hopper by the required distance to clear the supply vehicle.

Additional movement of the hopper can be obtained by pivoting the arm and first portion 38 about the vertical axis defined by the pins and the tube can be maintained at the same angle to the side of the tank by pivoting the tube around the post 53.

The ground wheels which support the hopper provides support for the hopper on both sides of the hopper and includes two pairs of ground wheels indicated at 26A and 26B respectively. Each pair of ground wheels comprises a transverse beam 26C carried on a pivot pin 26D attached to the side of the hopper 21. The beam is generally pivoted about its mid-point at the pin 26D and the pin is arranged adjacent the outer end 28 of the hopper so that the outer end and particularly the bottom corner 21A of the hopper is supported against engagement with the ground. The beam 26C carries a pair of castor wheels 26E and 26F. Each of the castor wheels is of a conventional nature rotatable about a respective vertical axis 26G. The beam 26C is pivotal about the pin 26D, the axes 26G are maintained vertical so that the castor wheels can work effective to castor around the axis. The beam 26C thus acts as a walking beam so that both of the wheels of the pair attached to the that walking beam remain in contact with the ground at all times in their castoring action.

In this way the hopper can be moved both side to side and in a direction at right angles to the side of the tank simply by the castor wheels following the direction of movement in their conventional castoring action.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. Apparatus comprising:
   a container having a side wall;
   a conveyor duct having a conveyor member mounted therein and operable to move a particulate material within the conveyor duct from a lower feed end to an upper discharge end;
   a hopper at the lower feed end into which the particulate material can be poured;
   a discharge spout at the upper discharge end for discharging the particulate material from the conveyor duct;
   at least one ground wheel on the hopper for supporting the hopper for movement over the ground;
   and a mounting assembly for mounting the conveyor duct on the container for movement relative thereto, the mounting assembly comprising:
   a support bracket mounted on the side wall of the container;
   a first portion mounted on the support bracket for pivotal movement about an upright axis such that the first portion can turn about the upright axis from a position along the side wall of the container to a position extending outwardly from the side wall of the container;
   an arm portion having an inner end mounted on the first portion for pivotal movement about a transverse axis on the first portion such that the arm portion can move from a raised position standing substantially vertically upwardly from the first portion along the side wall of the container to a lowered position extending outwardly from the side wall of the container;
   a drive member for driving movement of the arm portion between the raised and lowered positions;
   said at least one ground wheel being arranged to support the hopper while allowing rolling movement of the ground wheel in a direction longitudinally of the conveyor duct;
   and a swivel connection between the outer end of the arm portion and the conveyor duct at a position on the conveyor duct intermediate the upper and lower ends;
   the swivel connection being arranged to support the conveyor duct at the outer end of the arm portion;
   the swivel connection being arranged to allow the conveyor duct to pivot about a horizontal axis transverse to the duct such that the conveyor duct can change in angle relative to the arm portion as the arm portion moves between the raised and lowered positions;
   the swivel connection being arranged such that, with the hopper resting on the ground wheel in contact with the ground and the arm portion in the lowered position extending outwardly from the side wall of the container, the conveyor duct extends longitudinally of the arm portion and is held such that the conveyor duct passes upwardly above the outer end of the arm portion;
   the swivel connection being arranged such that movement of the arm portion from the lowered position to the raised position causes the hopper to be pulled in toward the container while lifting the upper end of the conveyor duct upward, while the at least one ground wheel rolls over the around and while maintaining the conveyor duct in position relative to the outer end of the arm portion such that the conveyor duct passes upwardly above the outer end of the arm portion;
   and the swivel connection being arranged to allow the conveyor duct to pivot about an upright axis at the outer end of the arm portion.

2. The apparatus according to claim 1 wherein the swivel connection includes an upright post which extends from the outer end of the arm upwardly to the conveyor duct and a coupling which controls an angle of the post relative to the arm portion to maintain the post upright as the arm portion moves between the raised and lowered positions.

3. The apparatus according to claim 2 wherein the post is mounted on the arm portion for pivotal movement about an axis longitudinal of the post so as to provide said upright axis at the outer end of the arm portion.

4. The apparatus according to claim 2 wherein the conveyor duct is pivotally connected to the upper end of the post for pivotal movement about an axis transverse to the post so as to define the horizontal axis.

5. The apparatus according to claim 2 wherein the coupling includes a link extending from the first portion to the post and extending along the arm portion generally parallel thereto.

6. The apparatus according to claim 1 wherein the drive member comprises a hydraulic cylinder.

7. The apparatus according to claim 1 wherein the arm portion is telescopic.

8. The apparatus according to claim 1 wherein the hopper includes two side walls each extending generally longitudinally of the conveyor duct and an end wall generally transverse to the side walls, wherein the at least one ground wheel of the hopper comprises two pairs of ground wheels, wherein each pair of ground wheels is arranged at a respective side wall of the hopper for supporting the respective side wall, wherein each wheel comprises a castor wheel mounted for swivel movement about a generally upstanding axis and wherein each pair of wheels is mounted at respective ends of a respective pivotal beam extending along the respective side wall of the hopper with each of the respective pivotal beams being mounted for independent pivotal movement about an axis transverse to the side walls of the hopper.

9. Apparatus comprising:
a container having a side wall;
a conveyor duct having a conveyor member mounted therein and operable to move a particulate material within the conveyor duct from a lower feed end to an upper discharge end;
a hopper at the lower teed end into which the particulate material can be poured;
a discharge spout at the upper discharge end for discharging the particulate material from the conveyor duct;
and a mounting assembly for mounting the conveyor duct on the side wall of the container for movement relative thereto to allow movement of the hopper in a direction inwardly and outwardly substantially at right angles relative to the side wall of the container to different positions of the hopper relative to the side wall of the container;
wherein the hopper includes two side walls each extending generally longitudinally of the conveyor duct and an end wall generally transverse to the side walls;
wherein the hopper is supported on two pairs of ground wheels,
said ground wheels being arranged to support the hopper while allowing rolling movement of the ground wheels in a direction longitudinally of the conveyor duct;
wherein each pair of ground wheels is being arranged at a respective side wall of the hopper for supporting the respective side wall;
wherein each ground wheel comprises a castor wheel mounted for swivel movement about a generally upstanding axis;
and wherein each pair of ground wheels is mounted at respective ends of a respective pivotal beam extending along the respective side wall of the hopper with each of the respective pivotal beams being mounted for independent pivotal movement about an axis transverse to the side walls of the hopper.

10. Apparatus comprising:
a container having a side wall;
a conveyor duct having a conveyor member mounted therein and operable to move a particulate material within the conveyor duct from a lower feed end to an upper discharge end;
a hopper at the lower feed end into which the particulate material can be poured;
a discharge spout at the upper discharge end for discharging the particulate material from the conveyor duct;
at least one ground wheel on the hopper for supporting the hopper for movement over the ground;
and a mounting assembly for mounting the conveyor duct on the container for movement relative thereto, the mounting assembly comprising:
a support bracket mounted on the side wall of the container;
a first portion mounted on the support bracket for pivotal movement about an upright axis such that the first portion can turn about the axis from a position along the side wall of the container to a position extending outwardly from the side wall of the container;
an arm portion having an inner end mounted on the first portion for pivotal movement about a transverse axis on the first portion such that the arm portion can move from a raised position standing substantially vertically upwardly from the first portion along the side wall of the container to a lowered position extending outwardly from the side wall of the container;
a drive member for driving movement of the arm portion between the raised and lowered positions;
said at least one ground wheel being arranged to support the hopper while allowing rolling movement of the ground wheel in a direction longitudinally of the duct;
and a swivel connection between the outer end of the arm portion and the conveyor duct at a position on the conveyor duct intermediate the upper and lower ends;
the swivel connection being arranged to support the conveyor duct at the outer end of the arm portion;
wherein the swivel connection includes an upright member which stands upwardly from the outer end of the arm portion to the conveyor duct and a coupling which controls an angle of the upright member relative to the arm portion to maintain the upright member upright as the arm portion moves between the raised and lowered positions;
the conveyor duct being mounted on an upper end of the upright member for pivotal movement about a horizontal axis transverse to the conveyor duct such that the conveyor duct can change in angle relative to the arm portion as the arm portion moves between the raised and lowered positions;
the swivel connection being arranged such that, with the hopper resting on the ground wheel in contact with the ground and the arm portion in the lowered position extending outwardly from the side wall of the container, the conveyor duct extends longitudinally of the arm portion and is supported by the upright member such that the conveyor duct passes upwardly above the outer end of the arm portion;
the upright member being arranged such that movement of the arm portion from the lowered position to the raised position causes the hopper to be pulled in toward the container while lifting the upper end of the conveyor duct upwardly, while the at least one ground wheel rolls over the ground and while the upright member maintains the duct in position relative to the outer end of the arm portion such that the conveyor duct passes upwardly above the outer end of the arm portion;

and the swivel connection being arranged to allow the conveyor duct to pivot about an upright axis at the outer end of the arm portion.

11. The apparatus according to claim 10 wherein the upright member comprises a post which is mounted on the arm portion for pivotal movement about an axis longitudinal of the post so as to provide said upright axis at the outer end of the arm portion.

12. The apparatus according to claim 10 wherein the hopper includes two side walls each extending generally longitudinally of the conveyor duct and an end wall generally transverse to the side walls, wherein the at least one ground wheel of the hopper comprises two pairs of ground wheels, wherein each pair of ground wheels is arranged at a respective side wall of the hopper for supporting the respective side wall, wherein each ground wheel comprises a castor wheel mounted for swivel movement about a generally upstanding axis and wherein each pair of ground wheels is mounted at respective ends of a respective pivotal beam extending along the respective side wall of the hopper with each of the respective pivotal beams being mounted for independent pivotal movement about an axis transverse to the side walls of the hopper.

* * * * *